United States Patent Office 3,259,594
Patented July 5, 1966

3,259,594
EXPANDABLE POLYSTYRENE COMPOSITIONS
Harold A. Wright, Murrysville, Pa., assignor to Koppers Company, Inc., a corporation of Delaware
No Drawing. Filed July 15, 1963, Ser. No. 295,183
5 Claims. (Cl. 260—2.5)

This invention relates generally to expandable styrene polymers. It pertains particularly to expandable copolymer compositions comprising lightly cross-linked expandable polystyrene.

Expandable styrene polymers which expand to 5-60 times their original dimensions when subjected to heat have been made heretofore by incorporating from 5-15 percent by weight of a suitable expanding agent, e.g., an aliphatic hydrocarbon, in the polymer. When such particles of expandable polystyrene are heated under confinement, the particles expand and fuse together to produce a plastic foam having a closed cellular structure. Such expandable polymers are commercially available. D'Alelio Patent No. 2,983,692 which issued May 9, 1961, for example, describes a method of producing expandable polymers.

The unique vertatility of expandable styrene polymers has been successfully demonstrated in many different fields. Expandable styrene polymers have, for example, been used for low temperature insulation, for packaging, in containers for hot or cold beverages, in flotation equipment, and in housing construction.

It has been recognized, nevertheless, that even greater use and advantages could be made of expandable styrene polymers if the expandable styrene polymers had relatively low densities and uniformly small cell sizes. The diameter of the cells of heretofore known foam styrene polymers will vary, in the same foamable particle, from 6-50 mils.

The disadvantageous large celled characteristics of the expandable polystyrene foams are particularly critical in the manufacture of insulated cups and other thin-walled molding materials. Large cells, particularly on the surface of the molded materials, present a distinctly disadvantageous aesthetic quality because of the frosty or "crystal" appearance (as opposed to opaque, white) and they also impair fusion which in the case of insulated cups contributes to many leaking problems.

It is also well-known that if expandable polystyrene particles can produce foam structures of low density, e.g., about one pound per cubic foot, the thus-produced foamed materials will be advantageous when they are used as insulation, fillers, lightweight aggregate, etc. Low density, uniformly small-celled, expandable polystyrene has heretofore been produced, for example, by incorporating an isopentane-paraffinic hydrocarbon additive blowing agent into the styrene polymer. The required use of the isopentane-paraffin expanding agent in expandable polystyrene has provided disagreeable odors within the expanded articles manufactured therefrom. These odors are particularly undesirable when the expandable particles are used to manufacture such products as drinking cups.

This invention provides a novel, expandable copolymer which will yield structures of foamed copolymers that, upon foaming, will expand to about one pound per cubic foot densities while simultaneously retaining uniformly small cell sizes of from two to twelve mils. The novel expandable copolymers of this invention are comprised of a predominant amount of styrene and a minor proportion of a diallyl ester of saturated aliphatic dibasic acids which acids contain from two to six carbon atoms, said copolymer having uniformly incorporated therein a normally liquid expanding agent.

Styrene polymers, as referred to in the compositions of this invention, include corresponding polymers of closely related homologues, e.g., alpha methyl styrene; ortho, meta, and para-ethyl styrene; ortho, meta, and para-methyl styrene; 2,4-dimethyl styrene, etc.

The diallyl esters of saturated aliphatic dibasic acids usable in this invention include diallyl oxalate, diallyl succinate, diallyl adipate, diallyl malonate, diallyl methylsuccinate, diallyl dimethylsuccinate, diallyl glutarate, diallyl methylgluarate, and the like.

In accordance with this invention, expandable copolymer particles capable of being expanded into a low density uniformly small-celled cellular polymeric structure are produced by polymerizing a solution in a suspension polymerization system of styrene and a diallyl ester of a saturated aliphatic dibasic acid and thereafter subjecting the suspension of copolymer to an atmosphere of a normally liquid expanding agent boiling within the range 25–40° C., e.g., normal pentane. The expanding agent may, of course, be incorporated into the expandable copolymer in any of other well-known ways. For example, the styrene-ester copolymer may be fed through an extruder and the expanding agent injected into the extruder so as to be incorporated into a molten mass of styrene copolymer. Thereafter, the novel copolymer particles containing an expanding agent can be individually expanded to provide discrete cellular particles having low densities (about one pound per cubic foot) and uniformly small cells. These individually expanded particles can then be placed in a mold and heated at a temperature above the boiling point of the expanding agent and above the softening or heat distortion temperature of the novel copolymer. Because of the exceptional expandable properties of the novel copolymer particles of this invention, an integral cellular copolymeric structure having low density and uniformly small cell sizes can be produced.

Advantageously, the diallyl esters of saturated aliphatic dibasic acids containing from two to six carbon atoms are used in preparing this copolymer to the extent of from 0.5–3.0 percent by weight based on the weight of the total monomers. Expandable copolymers of polystyrene and a diallyl ester of saturated dibasic acids containing less than 0.5 percent of the ester do not provide copolymer foams of sufficient uniform small cell sizes. Expandable copolymers containing more than about 3.0 percent by weight of the diallyl esters become too highly cross-linked and, as a result, resist expansion by the pentane expanding agent and therefore cannot provide low density uniformly small-celled products. The pentane which is used advantageously as the expanding agent for the novel copolymer of this invention may be a commercial grade of normal pentane which boils in the range of 30–36° C.

The invention will be illustrated further by the following examples.

Example 1

To a kettle equipped with a stirrer, 500 grams of deionized water are admixed with 0.015 gram Nacconol-NRSF (sodium dodecylbenzene-sulfonate), 6 grams of hydroxyapatite and the system purged with nitrogen. There are then added 500 grams of styrene containing 1 gram of benzoyl peroxide and 0.25 gram of t-butyl perbenzoate and simultaneously there are added 2.5 grams of diallyl oxalate and stirring is commenced. The system is heated over a period of from 7 to 9 hours at 90° C. and thereafter the mass is heated at 115° C. for four hours. The mass is then cooled to room temperature and then there are added 3.0 grams of Nacconol and 75.0 milliliters of n-pentane and the system maintained at 90° C. at approximately 60-90 p.s.i. for eight hours.

The suspension is cooled, the beads separated therefrom by centrifuging and the beads washed with dilute hydrochloric acid and then water washed. There are obtained free-flowing expandable copolymer beads containing pentane.

Dried expandable copolymer particles made as above may be heated immediately after manufacture using conventional means such as described on page 19 of the Koppers Company, Inc. Booklet entitled "Dylite Expandable Polystyrene" to make low density foam materials, i.e., having a density of about one pound per cubic foot having uniformly small cell sizes.

The expanded copolymer particles prepared in accordance with the procedure of Example I were subjected to varying behavior tests to determine cell size, density and behavior toward toluene. The results of these tests are noted below in Table I. For purpose of comparison a composition of expandable polystyrene was prepared and foamed under similar conditions. The results of cell size, density, and behavior in toluene tests are also included in Table I.

TABLE I

| | Monomers | Weight Percent | Behavior in Toluene [1] | Foam Density (lb./ft.$^3$) | Foam Cell Size (mils) |
|---|---|---|---|---|---|
| 1 | Styrene / Diallyl Oxalate | 99.5 / 0.5 | Smooth Solution | 0.99 | 2-4 |
| 2 | Styrene / Diallyl Succinate | 99.5 / 0.5 | ----do---- | 0.89 | 3-6 |
| 3 | Styrene / Diallyl Adipate | 99.5 / 0.5 | ----do---- | 0.92 | 3-9 |
| 4 | Styrene | 100.0 | ----do---- | 0.94 | 6-44 |

[1] Appearance of 0.5 gram of impregnated beads in 5 ml. of toluene rolled in a capped vial for 24 hours at room temperature.

*Example II*

In each of a series of experiments, copolymer expandable foams were prepared in accordance with the procedure of Example I. The copolymer foams were prepared using, as the monomeric starting materials, styrene and varying esters of saturated dibasic acids. The proportions of monomers used in preparing the copolymers were varied within the ranges specified hereinabove. The various expandable copolymer materials prepared in the series of experiments in this example were subjected also to the physical tests performed on the expandable copolymer particles obtained in Example I. Table II identifies each expandable copolymer composition by stating the proportions of styrene and diallyl ester of saturated dibasic acids in the monomer starting materials from which the copolymers were prepared. The cell-size measurement of the expanded foams was evaluated microscopically using a projected stage micrometer scale to measure the approximate cell diameters. To this end, an expanded bead was sliced into two hemispheres and a wedge-like semicircular wafer whose straight edge forms the apex of the wedge was cut from one hemisphere. This wafer was used under 50× magnification, the image being superimposed on the projected scale above to permit direct measurement of the various cells along the base of the semicircle. By having the apex of the wedge coincide with this base, interference from shadows of all the cells behind the one being measured was avoided. The range of values recorded in Table I represents the majority of cells along the base.

TABLE II

| | Monomers | Weight Percent | Behavior in Toluene | Foam Density (lb./ft.$^3$) | Foam Cell Size (mils) |
|---|---|---|---|---|---|
| 1 | Styrene / Diallyl Oxalate | 99.5 / 0.5 | Smooth Solution | 0.99 | 2-4 |
| 2 | Styrene / Diallyl Oxalate | 99.0 / 1.0 | ----do---- | 0.92 | 2-6 |
| 3 | Styrene / Diallyl Oxalate | 98.5 / 1.5 | ----do---- | 1.05 | 3-8 |
| 4 | Styrene / Diallyl Oxalate | 98.0 / 2.0 | ----do---- | 1.14 | 2-5 |
| 5 | Styrene / Diallyl Succinate | 98.5 / 1.5 | ----do---- | 1.02 | 4-10 |
| 6 | Styrene / Diallyl Succinate | 97.0 / 3.0 | ----do---- | 1.20 | 4-8 |

*Example III*

In each of a series of experiments a charge of styrene and a diallyl ester of a saturated aliphatic dibasic acid were copolymerized and impregnated in accordance with the procedure of Example I. In these series of experiments, the proportion of diallyl ester used was below or above the critical ranges hereinabove stated. Table III identifies each expandable copolymeric composition by stating the proportions of styrene and ester monomer starting materials from which copolymer foams were prepared. The table also gives the results of the tests run on these materials which testing was identical to that used on the copolymer foams of Example II.

TABLE III

| | Monomers | Weight Percent | Behavior in Toluene | Foam Density (lb./ft.$^3$) | Foam Cell Size (mils) |
|---|---|---|---|---|---|
| 1 | Styrene / Diallyl Succinate | 99.8 / 0.2 | Smooth Solution | 0.95 | 6-28 |
| 2 | Styrene / Diallyl Succinate | 95.0 / 5.0 | Swollen, Sticky Beads | 1.42 | 5-10 |

In the above examples and their resultant tables, the test which indicates the behavior of the polymers and the copolymers toward toluene is significant in determining the ability of the particular expandable polymer or copolymers to provide low, e.g., about one pound per cubic foot, density copolymer foams having uniformly small cell sizes. In observing the action of toluene on the particular materials an expandable foam which forms smooth solution or slight gel in the toluene will upon expansion under heat provide desirable low density foam materials. On the other hand, those copolymers which, when observed in toluene, provide thick viscous gels or become swollen beads do not provide the required low density foam products. In fact, the density becomes extremely high and undesirable. This is an indication of the amount or the degree of cross-linking which takes place between the copolymers. The range amount of esters used in preparing the copolymer foams of this invention is therefore extremely critical with respect to the ultimate density, as well as cell size, of the foamed products.

Polystyrene foams, as opposed to the copolymer foams of this invention, do not have good, uniformly small cell sizes even though the polystyrene foams form a solution in toluene. It is only the copolymer foams, as provided in this invention, which contain the critical comonomer amounts and which form solutions in toluene, that have uniformly small cell sizes and low densities.

In each of the examples wherein comparative data are given between copolymer foams and polymer foams, e.g., expandable polystyrene, the conditions of polymerization impregnation with expanding agent and retention of volatiles was kept substantially identical.

The foregoing has described a novel, foamable copolymer particle and a method for producing said particle. The novel foamable copolymer of this invention will expand to densities of about one pound per cubic foot. The thus-expanded particles or beads also contain uniformly small cells which measure from two to twelve mils in diameter. The shaped objects made from the expandable particles of this invention will retain substantially the same density as the expandable particles from which the shaped object is made and the individual foam particles making up the foamed object will also have substantially uniform cells averaging from two to twelve mils in diameter.

The foamed products made from these novel particles are useful as insulated building panels, floats, cushioning material, containers for hot or cold liquids, display objects and the like. The ability to expand to low density in a given volume makes the use of the particles economically advantageous for all applications where lightweight foamed objects are of interest.

I claim:

1. A foamable styrene copolymer suitable for forming a cellular article possessing uniformly small cells and having a density of about one pound per cubic foot which composition comprises a copolymer of from 97.0–99.5 parts by weight of styrene and from 3.0–0.5 parts by weight of a diallyl ester of a saturated aliphatic dibasic acid which acid contains from two to six carbon atoms said copolymer being soluble in toluene and said copolymer having uniformly incorporated therein a normally liquid expanding agent.

2. An expandable copolymer composition comprising a copolymer of from 97.0–99.5 parts by weight of styrene and from 3.0–0.5 parts by weight of a diallyl ester of a saturated aliphatic dibasic acid which acid contains from two to six carbon atoms said copolymer being soluble in toluene and said copolymer having uniformly incorporated therein a normally liquid expanding agent.

3. A foamable copolymeric particle having uniformly incorporated therein a normally liquid expanding agent, said copolymeric particle being comprised of styrene and from 3.0–0.5 parts by weight of a diallyl ester of a saturated aliphatic dibasic acid which acid contains from 2–6 carbon atoms, said copolymer being soluble in toluene and said copolymer having uniformly incorporated therein a normally liquid expanding agent.

4. The composition of claim 1 in which said normally liquid expanding agent is n-pentane.

5. A method for the production of lightly cross-linked foamable styrene copolymeric particles which upon heating will expand to a structure of about one pound per cubic foot density having uniformly small cells which method comprises forming an aqueous suspension of a peroxide catalyst, from 97.0–99.5 parts by weight of styrene, from 3.0–0.5 parts by weight of a diallyl ester of a saturated aliphatic dibasic acid which acid contains from 2–6 carbon atoms with the aid of a suspending agent, heating said suspension to cause said styrene and said acid to copolymerize to form a suspension of particles of copolymer, said particles being insoluble in toluene, contacting said suspension with a normally liquid expanding agent until said expanding agent is incorporated within said particles and thereafter separating said particles from said medium.

References Cited by the Examiner

UNITED STATES PATENTS

| | | | |
|---|---|---|---|
| 2,202,846 | 6/1940 | Garvey et al. | 260—78.5 |
| 2,216,094 | 9/1940 | Britton et al. | 260—78.5 |
| 2,311,607 | 2/1943 | Coleman et al. | 260—78.5 |
| 2,430,109 | 11/1947 | D'Alelio | 260—78.5 |
| 2,848,427 | 8/1958 | Rubens | 260—2.5 |
| 2,848,428 | 8/1958 | Rubens | 260—2.5 |
| 3,001,954 | 9/1961 | Buchholtz et al. | 260—2.5 |

FOREIGN PATENTS

| | | |
|---|---|---|
| 632,108 | 11/1949 | Great Britain. |

OTHER REFERENCES

"Styrene, Its Polymers, Copolymers and Derivatives," Boundy-Boyer-Rheinhold Publishing Corp., N.Y., copyright 1952, pages 878–879.

SAMUEL H. BLECH, *Primary Examiner.*

MURRAY TILLMAN, *Examiner.*

MORTON FOELAK, *Assistant Examiner.*